United States Patent [19]

Jodoin

[11] Patent Number: 5,063,591
[45] Date of Patent: Nov. 5, 1991

[54] TOLL TICKETING RECORD GENERATION FOR BILLING OF INTERSYSTEM HANDOFF CALLS IN A MOBILE TELEPHONE SYSTEM

[75] Inventor: Dominique Jodoin, Chateuguay, Canada

[73] Assignee: Telefonaktiebolaget L M Ericsson, Stockholm, Sweden

[21] Appl. No.: 604,796

[22] Filed: Oct. 26, 1990

[51] Int. Cl.⁵ .................. H04M 15/04; H04M 15/16; H04Q 7/02
[52] U.S. Cl. ..................................... 379/115; 379/60; 379/133
[58] Field of Search ................. 379/121, 60, 115, 116, 379/133

[56] References Cited

U.S. PATENT DOCUMENTS

| | | | |
|---|---|---|---|
| 3,829,617 | 8/1974 | Calthamer et al. | 379/115 |
| 4,698,839 | 10/1987 | DeVaney et al. | 379/60 |
| 4,876,738 | 10/1989 | Selby | 379/60 |

Primary Examiner—Stafford D. Schreyer
Attorney, Agent, or Firm—Johnson & Gibbs

[57] ABSTRACT

A method and system for producing a toll ticketing record for a call with a mobile subscriber moving within the cells of at least two exchanges and generating a toll ticketing record of the call which includes sections which are related to the intersystem legs of the call.

6 Claims, 5 Drawing Sheets

TOLL TICKETING RECORD GENERATION FOR BILLING OF INTERSYSTEM HANDOFF CALLS IN A MOBILE TELEPHONE SYSTEM

BACKGROUND OF THE INVENTION

1. Field of the Invention

The present invention relates to mobile radio telephone systems and, more particularly, to a method and apparatus for generating toll ticketing records for the billing of calls within a mobile telephone system.

2. History of the Prior Art when a mobile subscriber originates or receives a phone call in a mobile telephone switching office ("MTSO") (also referred to as Cellular System or exchange), that MTSO collects charging data during the call and outputs it in the form of a call billing record (a "toll ticketing record" or a TT record) at the end of the call. Such charging data may include, for example, a call identification number, the mobile station number, the subscriber number, the date, the number called and the time duration of the call. These billing records are then stored on a recording medium such as a magnetic tape or a hard disk and are later processed to produce telephone bills that can be sent to the subscriber.

When two or more MTSO's serve adjacent cellular radio coverage areas and share a geographical boundary, existing functions within the systems may allow calls to start in one exchange and terminate in another. When a moving mobile station having a call in progress crosses the boundary between two adjacent systems, the call is "handed over" from the initial exchange ("anchor exchange") to the second exchange ("serving exchange"). Thus, calls are handed over not only from cell to cell during the normal course of operation within a cellular communication exchange but also from one exchange to another. The process of handing over calls from one exchange to another is called an interexchange handoff or an intersystem handoff.

If the call with which a mobile is engaged occurs entirely within the same MTSO that MTSO is entitled to the entire revenue from the use of its cellular facilities by the mobile. However, if the mobile travels through and uses the cellular communications facilities of more than one MTSO, each system should receive a proportional share of the revenues from that call.

While there are prior art systems for collecting and forwarding call charging information from a mobile home exchange to a visited exchange in which a roaming mobile may originate a call, such as that shown in U.S. Pat. No. 4,698,839, even if the anchor exchange produces TT records for calls which are handed over to a second, and perhaps subsequent exchange, these records do not indicate the time during which the mobile was present in the serving exchange. Furthermore, in the call billing record currently produced by the anchor exchange, there is no indication whether a call went through an interexchange handoff or not. Therefore, revenues which should be owed to the serving exchange for the use of its cellular communications facilities are not properly recorded in the call billing records and therefore that exchange does not derive a fair share of the revenues received from the mobile for handling a portion of such calls.

Accordingly, it would be desirable to have a method and system within the anchor exchange of a cellular call for generating a record for the operator of that exchange, as well as all other exchanges to which the mobile is handed off during the call, of the time at which a call is handed off to a serving exchange and the identity thereof.

SUMMARY OF THE INVENTION

In one aspect the invention includes a method and system for producing a toll ticketing record for a call with a mobile subscriber moving within the cells of a cellular mobile radio communications network which includes at least two different exchanges, an anchor exchange in which the mobile was located when the call began and a serving exchange into which the mobile moves while the call is in progress. A toll ticketing record is generated within the anchor exchange in response to the initiation of a call to which the mobile is a party. The record includes a call identification number and a number identifying the mobile. A start time is entered in the toll ticketing record in response to an answer by the called party of the initiated call. A first handoff of the radio circuit of the mobile is attempted from the anchor exchange to the serving exchange in response to the mobile moving from the cells of one exchange to the other. A section of the toll ticketing record is allocated for information related to an intersystem call and a start time and serving exchange designation is entered in the intersystem call section of the toll ticketing record in response to the handoff being successfully completed. A stop time is entered in the intersystem call section of the toll ticketing record in response to either the successful completion of a second handoff of the mobile from the serving to another exchange or to termination of the call. Finally, a stop time is entered into the toll ticketing record in response to termination of the call and the toll ticketing record is output and released.

BRIEF DESCRIPTION OF THE DRAWINGS

For a more complete understanding of the present invention, and for further objects and advantages thereof, reference may now be had to the accompanying description taken in conjunction with the accompanying drawings in which.

DETAILED DESCRIPTION

Figure 1:
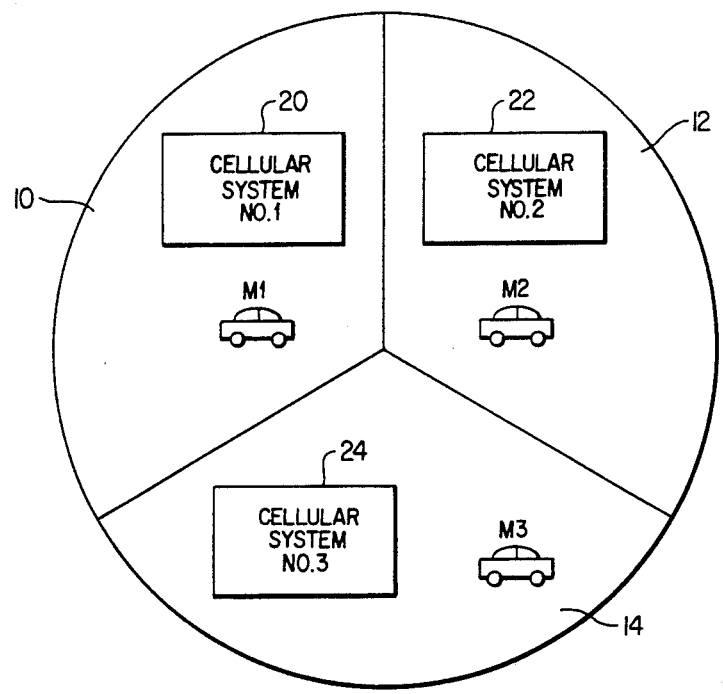
FIG. 1 is an illustrative diagram of three networked cellular systems showing their respective areas of coverage areas and mobile subscribers.

Referring first to FIG. 1, there is illustrated three networked cellular systems 20, 22, and 24 each having a corresponding coverage area 10, 12, and 14, respectively. Each of the cellular systems may contain a plurality of mobile units M1, M2, and M3. Each of the systems 20-24 is made up of a plurality of cells which define specific geographic areas within the systems. When a mobile travels from cell to cell within a system its communications circuit is handed off from one cell to another. Each cellular system 20-24 is coupled to the other cellular systems by a network of data and voice lines for communicating data messages and for interconnecting intersystem telephone calls respectively. The network of data and voice lines between the cellular systems 20-24 may be implemented by dedicated lines or may be routed through the existing land line telephone network.

In a cellular telephone system a mobile subscriber is in radio communication with the cellular system within which the mobile subscriber either initiates or receives a call. The electronic communications circuit between the mobile station and the base station of the cellular systems is maintained throughout the entire length of the phone call. When a call is initiated or received by a mobile which remains within a single system, a toll ticket is generated within the cellular system which contains certain identifying information related to the mobile and the call. The toll ticket will record the overall time duration of the entire call to which the mobile was a party regardless of the number of handoffs from one cell to another which may occur during the call. In general, this creates no billing problem for the system operator because the communications facilities within each of the cells through which the mobile traveled are all owned by the same operator.

Similarly, whenever mobile units M1, M2 or M3 pass between the borders of cellular systems 20-24 an intersystem handoff may be required. However, when a single call is handed off from one system to another, this does create a billing problem because frequently different cellular systems are owned by different operators who should be compensated for the use of the communications facilities by the mobile within their systems during the call. Therefore, once a successful handoff is achieved between, for example, from cellular system No. 1 to cellular system No. 2, a record should be created to reflect the time a mobile subscriber, such as M1, spends on the call while in the serving area of cellular system No. 2. That record should comprise a section of the toll ticketing record pertaining to the intersystem leg of the call. Further, if M1 travels to the serving area of cellular system No. 3 another record should be generated to reflect the time during which the mobile M1 used the communications facilities of that system. This second record should comprise a separate section of the toll ticketing record pertaining to the second intersystem leg of the call. However, if the mobile M1 initially placed or received the call while in the serving area of cellular system No. 1, that system becomes the anchor exchange and controls the telephone call communications connection and the billing for the entire call. The present invention provides a system and method for accounting for the time periods a mobile subscriber is not in the initiating or anchor exchange to permit a sharing of revenues produced by the call between cellular systems which contributed communications facilities to enable the call to take place.

Figure 2:
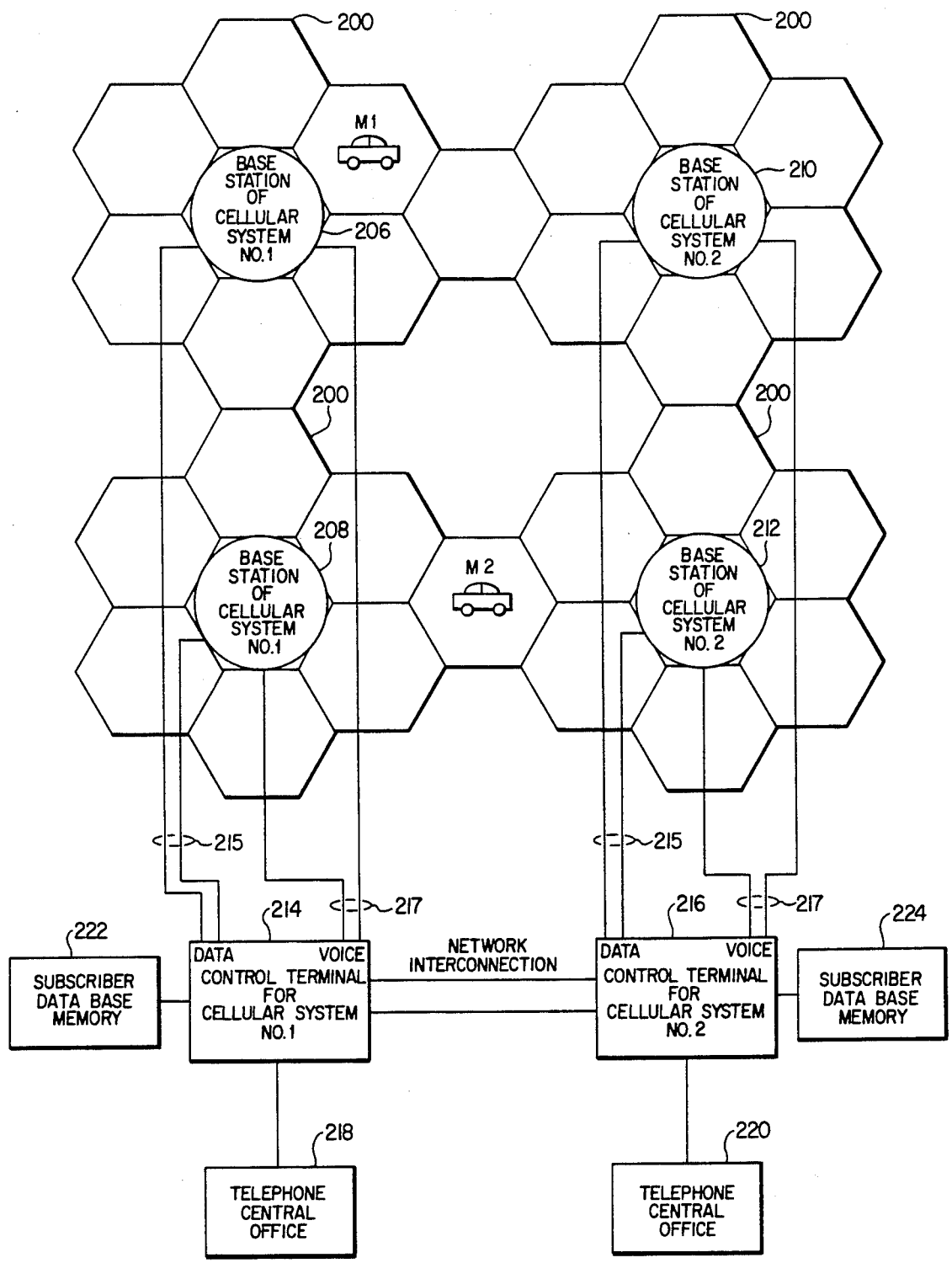
FIG. 2 is a block diagram of a conventional center illuminated sector cellular system including a toll ticketing system constructed in accordance with the present invention.

Referring now to FIG. 2, there is shown an illustrative block diagram of cellular systems Nos. 1 and 2, which correspond to cellular systems 20 and 22 in FIG. 1. As illustrated in FIG. 2, the geographical area within each system is subdivided into cells 200 which are illuminated with radio frequency energy from associated base stations 206, 208, 210 and 212. Each base station 206, 208, 210 and 212 is coupled by data and voice lines 215 and 217 to a radio telephone control terminal 214 and 216 in the cellular system of which it forms a part. These data and voice lines may be provided by dedicated wire lines, pulse code modulated carrier lines, microwave radio channels, or other suitable communication lines. Control terminals 214 and 216 are also coupled to the existing telephone network by conventional telephone central offices 218 and 220 for completing telephone calls between mobile and land line telephones. Each of control terminals 214 and 216 are connected to a subscriber data base memory 222 and 224, respectively, which contain information about the different mobile subscribers served by those systems and which is used for ticketing calls and other functions.

Mobile subscriber M1 is connected to the control terminal 214 through a radio link to base station 206. Similarly, throughout any telephone call initiated by either of the mobiles M1 or M2 from one of the cellular systems 10, 12, or 14, that mobile would be connected to the initiating (or anchor) exchange's control terminal. As shown in FIG. 2, control terminal 214 provides the switching for the subscriber M1 for the duration of any call it originates or terminates. When the mobile M1 travels from cellular system No. 1 to a second cellular system, a handoff occurs and a radio link between the mobile M1 and the second cellular system is created. However, in the system of the present invention, at the time of a successful handoff a signal is sent to the anchor exchange to initiate a new section in the toll ticketing record and begin timing that portion of the call. Since the mobile M1 is always in communication with its anchor exchange as the mobile M1 travels and is handed off from one cellular system to another, new records are sequentially initiated and terminated for each different intersystem leg of the call.

Figure 3:
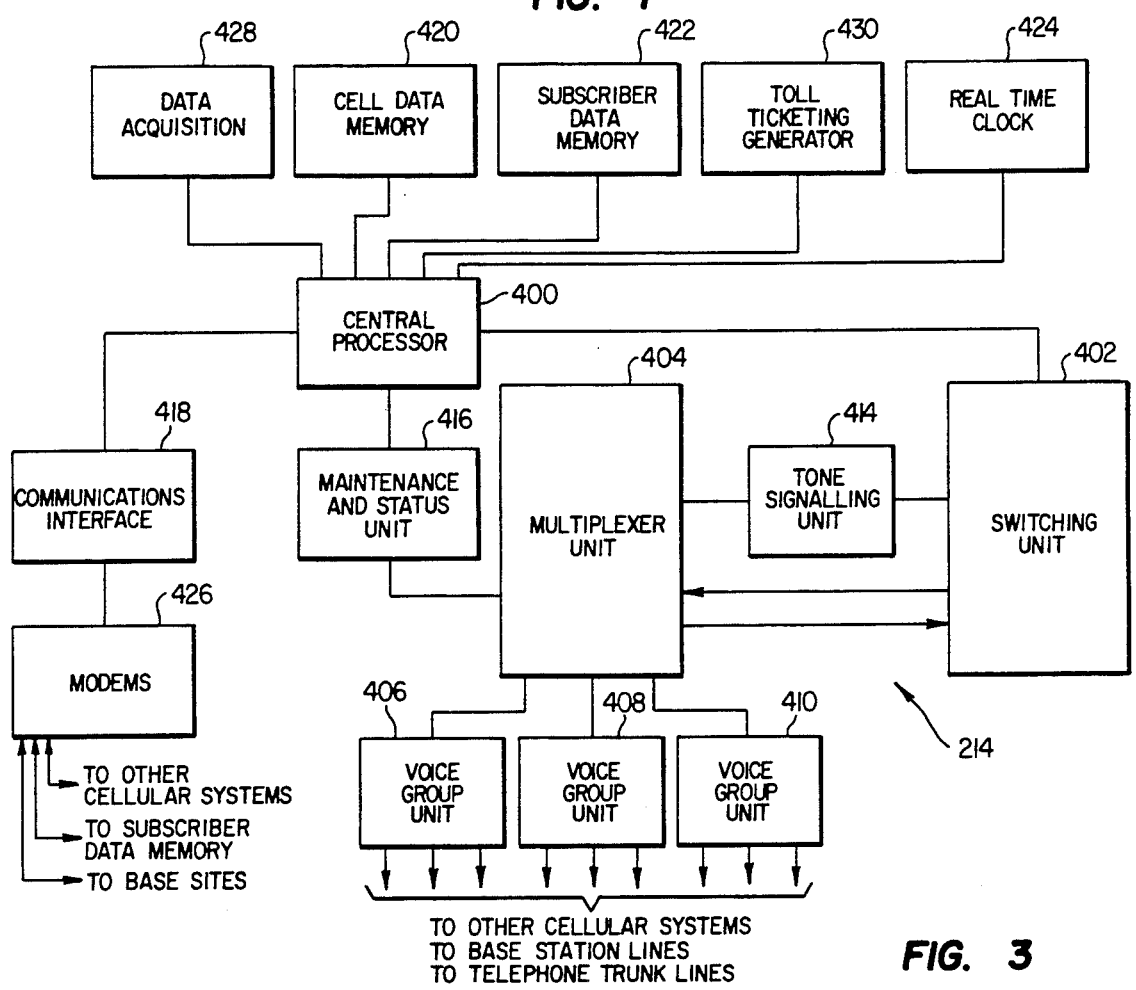
FIG. 3 is a block diagram of a control terminal employed in the cellular system illustrated in FIG. 2.

A functional block diagram of an illustrative control terminal 214 is shown in FIG. 3. The control terminal consists of a central processor 400 which is connected to a switching unit 402 which provides the interconnection required to complete a phone call. A multiplexer unit 404 is connected to the switching unit 402. The multiplexer unit 404 is connected to a plurality of voice group units 406, 408 and 410 which provide a link with the other cellular systems, other base stations and the telephone trunk-lines. The multiplexer unit 404 and the switching unit 402 are also connected to a tone signaling unit 414. The central processor 400 is connected to the multiplexer unit 404 through a maintenance and status unit 416. The central processor 400 is also connected to a communications interface 418, which is in turn connected to a plurality of modems 426 which provide a connection to other cellular systems, the subscriber data memory and the base sites. A real time clock 424 provides the timing for recording the beginning and end times of call segments and other relevant time periods. The real time clock 424 is also connected to the central processor 400. A cell data memory 420, a subscriber data memory 422, a data acquisition module 428 and a toll ticketing generator 430 are also shown. The cell data memory 420 stores data identifying border cells, adjacent cells and lists of signaling channels for directed retries. The subscriber data memory 422 stores data for identifying valid subscriber identification numbers and other subscriber related information. The toll ticketing generator 430 is connected to the central processor 400 of the control terminal 214 and receives signals related to a mobile subscriber at the initiation of a call, at various handoff points during the call and at the termination of the call. The toll ticketing generator 430 maintains a record of every call initiated on the cellular system which includes all important data associated with the call. The toll ticketing generator also allocates sections in the toll ticketing record for any intersystem handoff legs of the call that occur. At the end of a call a toll ticketing ("TT") record is output by the toll ticketing generator 430 and may include, a record of the periods during a call which took place while the mobile subscriber was in the serving area of a different cellular system than the initiating or anchor exchange and the identity of each such serving exchange.

Figure 4:
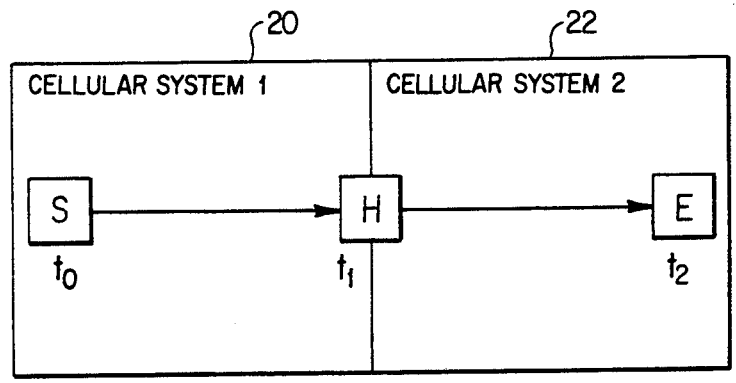
FIG. 4 is a diagram illustrating the creation of toll ticketing records in accordance with the present invention for a mobile subscriber initiating a call in one cellular system and terminating that call in another cellular system.

Referring now to FIG. 4, there is shown an illustrative diagram depicting a call either to or from a mobile station initially situated in cellular system 1 which starts (S) at time T0 and which is handed over (H) at time T1 to cellular system 2 and which subsequently terminates (E) at time T2. The illustrative call is initiated at time T0 at which time a call billing record is initiated by the anchor exchange, i.e., cellular system 1. At time T1, handoff from one cellular system to another occurs, i.e., from cellular system 1 to cellular system 2, and a handoff billing record or section of the toll ticketing record is generated in cellular system 1, the anchor exchange in response to a handoff successful signal sent by the mobile to the anchor exchange. At time T2, when the call is terminated, another handoff billing record or section of the toll ticketing record is generated by cellular system 1 and the call billing record and the handoff billing record are output by the exchange which generated them, system 1. The initiating or anchor exchange, system 1, controls the billing record generation process throughout the duration of the call. The final call billing record generated and produced by the anchor exchange of the call will indicate that the call started at T0 and ended at T2. This record is the one which is output by the current billing systems to charge a subscriber for a call. The handoff billing record, also created within the anchor exchange, will contain information that the call was handed over to the serving exchange, cellular system 2, at time T1 and that this portion of the call handled by the serving exchange ended at T2 when the call was terminated. This record is the one which is produced by the system of the present invention and which will be used to proportionally divide the revenues generated by the call between the respective operators of cellular systems 1 and 2 to appropriately compensate each for the use of its communications facilities during the call.

Figure 5:
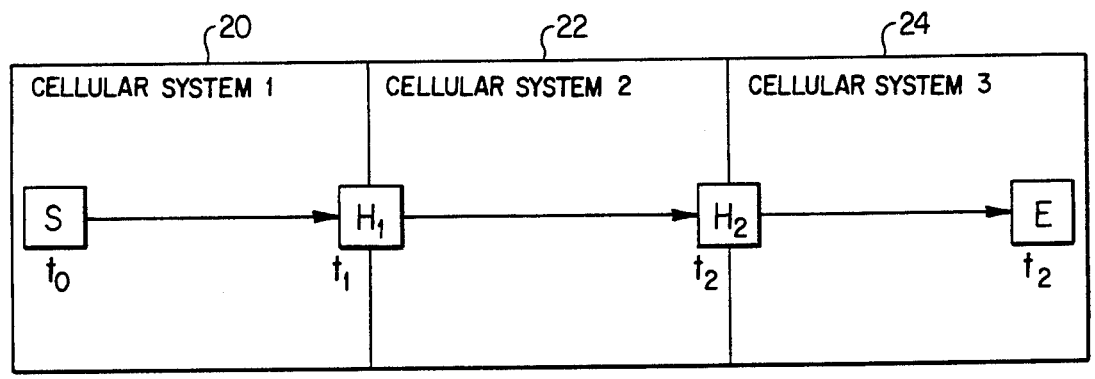
FIG. 5 is a diagram illustrating the creation of toll ticketing records in accordance with the present invention for a mobile subscriber initiating a call in one cellular system, traveling to a second cellular system and terminating the call in a third cellular system.

Referring next to FIG. 5, there is shown an illustrative diagram depicting a call either to or from a mobile station which starts (S) with the mobile initially situated in cellular system 1 at time T0. The call is first handed over (H1) to cellular system 2 at time T1; and thereafter handed over again (H2) from cellular system 2 to cellular system 3 at T2. The call finally ends with the mobile situated in cellular system 3 at time T3. The call billing record generated by the anchor exchange, cellular system 1, will indicate that the call started at time T0 and ended at time T3. This is the record that is currently output by cellular systems to charge a subscriber for the call. In the system of the present invention, the first handoff billing record, also generated by the anchor exchange, cellular system 1, will contain the information that the call was handed over to cellular system 2 at time T1 and that this portion of the call handled by cellular system 2 ended at time T2. The second handoff billing record of cellular system 1 will contain the information that the call was handed over from cellular system 2 to cellular system 3 at time T2 and this portion of the call handled by cellular system 3 ended at time T3. The intersystem legs of the call are recorded in separate sections of the toll ticketing record generated by the toll ticketing generator. The handoff billing records generated and produced by cellular system 1, the anchor exchange, will be used to proportionally divide the revenue from the call received by cellular system 1 with cellular systems 2 and 3 for the use of their facilities.

Figure 6:
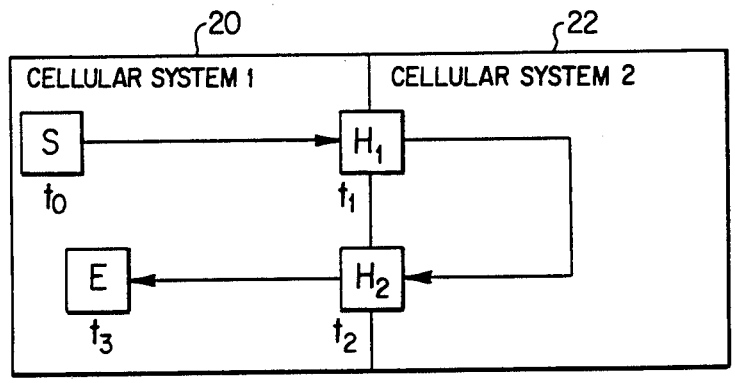
FIG. 6 is a diagram illustrating the creation of toll ticketing records in accordance with the present invention for a mobile subscriber initiating a call in one cellular system, traveling to a second cellular system and returning to the first cellular system.

Referring now to FIG. 6, there is shown an illustrative diagram depicting a call either to or from a mobile station initially situated in cellular system 1 which starts (S) at time T0 and which is subsequently handed over (H1) to cellular system 2 at time T1. The call is subsequently handed back (H2) to cellular system 1, at time T2 where the call finally ends (E) at time T3. At time T0, a call billing record is initiated by the anchor exchange, cellular system 1. At time T1, a handoff billing record or section of the toll ticketing record is generated by the anchor exchange which records the time during which the mobile traveled into cellular system 2. At time T2, a handoff billing record is generated by cellular system 1 reflecting the mobile's reentry from system 2 to system 1 and recording the duration of the period, i.e., from T1 to T2 during which the call was continued in cellular system 2. At time T3 when the call ends, a call billing record is output indicating that a call lasted from time T0 to time T3 and a handoff billing record is output showing the proportion of the total time the call continued in each of the two cellular systems 1 and 2.

Figure 7A:
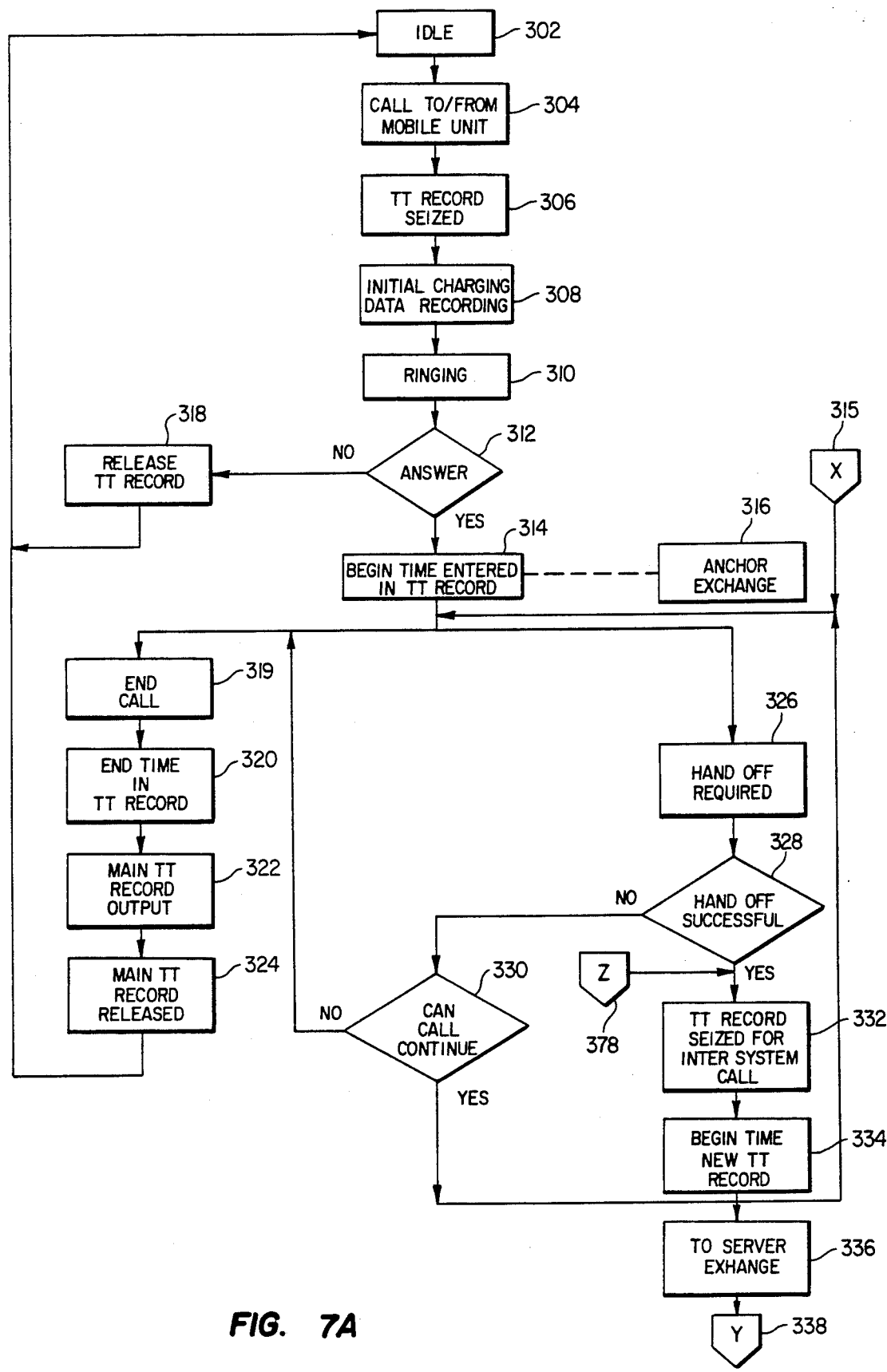
FIG. 7A is a flow diagram describing the creation of toll ticketing records in accordance with the present invention for a call which includes a handoff from an anchor exchange to a serving exchange.

Referring next to FIG. 7A, there is shown a flow diagram depicting in greater detail the process of generating the toll ticketing record in accordance with the present invention and illustrated by the examples of FIGS. 4, 5 and 6 of the creation of TT records for intersystem calls. In FIG. 7A the process is entered at IDLE block 302 denoting the status of a mobile subscriber which is not engaged in a call through the cellular system. At block 304, the mobile unit enters the active condition when a telephone call is either initiated by the mobile subscriber or is received by the mobile subscriber. Once a call is initiated through the mobile subscriber, a signal is sent within the anchor exchange where a toll ticketing ("TT") record is seized at block 306. The act of seizing a TT record includes the allocation of a memory location for the storage of charging information during the call. At block 308 the TT record is initialized with certain charging data including a call identification number, the mobile station number, the mobile station electronic serial number, the date, the time and the number to which the mobile subscriber is connected. At block 310 either the called mobile subscriber is rung or the party which the mobile subscriber is calling is rung. After ringing is initiated at 310, a decision block 312 is reached and if there is an answer, the YES branch is taken to block 314 where the beginning time of the call is recorded in the TT record. This recording of beginning time is controlled by the anchor exchange 316 of the mobile through which the call was initiated. If there is no answer to the ringing at 310 the NO branch of decision block 312 is taken and the TT record is released at block 318 and the mobile system returns to IDLE at block 302.

If the mobile subscriber having the call in progress remains within its anchor exchange, then the call will eventually terminate as depicted at block 319. The time at which the call was terminated is written into the main TT record being generated by the mobile's anchor exchange at block 320 which is then output by the exchange at block 322 and the TT record is released at block 324. The output of a TT record involves the transfer of charging information recorded during the call from temporary memory locations to permanent memory, such as magnetic tape or hard d storage. The release of a TT record is the return of the previously seized memory locations at which charging information was stored during the call to an available condition subject to reseizure for use on a subsequent call. Once the TT record is released, the mobile subscriber is returned to the idle mode at block 302.

At various times the mobile subscriber having a call in progress may approach the border of its anchor exchange and pass into an adjacent exchange which requires a handoff from one exchange to the other. Even though there is a handoff from the mobile's anchor exchange to a serving exchange, the anchor exchange retains control over the telephone call itself and continues to provide the appropriate switching for that call. When the anchor exchange is required to handoff the mobile subscriber with a call in progress to a cell of a serving exchange, the system recognizes this at block 326 and a decision block 328 is reached where the handoff is either successful or not successful. If handoff is not successful, for reasons such as congestion or the unavailability of a radio circuit of acceptable quality, the NO branch is taken to decision block 330. If the call can be continued despite the inability to complete the handoff, the affirmative path at decision block 330 is taken to point X at 315 where the call continues in the anchor exchange just as it was doing before handoff was required at 326. If the call cannot continue without handoff, the NO branch is taken at block 330 to end the call at block 319. At the end of a call, the end time is written in the main TT record in block 320, the main TT record is output at block 322 and the main TT record is released at block 324 after which the mobile unit is returned to an idle condition at block 302.

If, however, the mobile subscriber with a call in progress was successfully handed off from the anchor exchange to a serving exchange at block 328, the YES branch is taken to block 332 and a new section of the toll ticketing record is seized within the anchor exchange at block 332. Seizure of a new section of a TT record for an intersystem section of a call is accomplished in the same manner as seizure of a main TT record, described above. The time at which the handoff occurred is recorded in a new section of the TT record at block 334 and at block 336 the serving exchange to which the mobile was handed off is identified in the TT record and the call continues in the serving exchange through point Y at block 338.

Figure 7B:
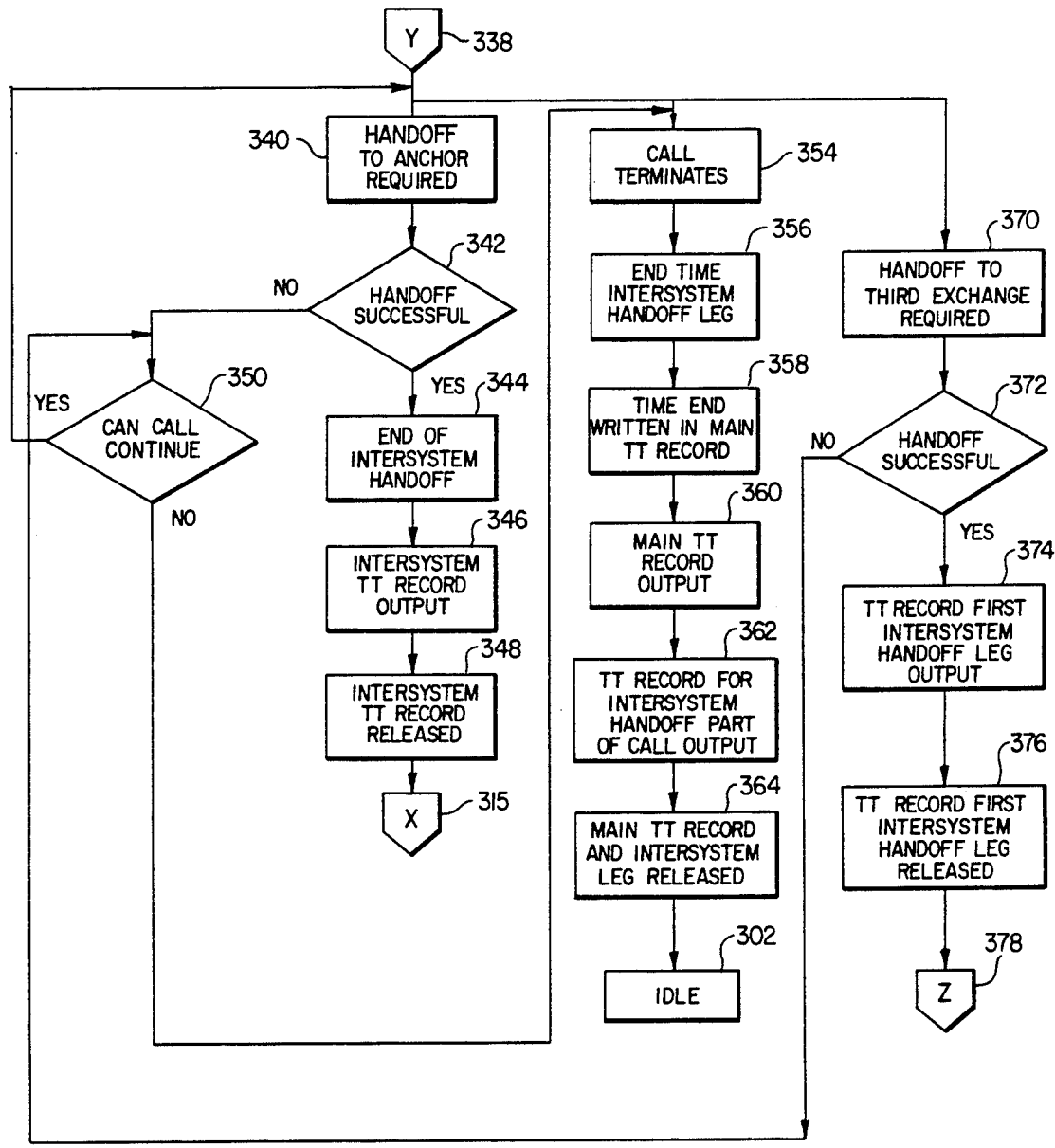
FIG. 7B is a flow diagram describing the creation of toll ticketing records in accordance with the present invention for a call which includes either a handoff back to the anchor exchange, a termination of the call in the serving exchange or a handoff from a first serving exchange to a second serving exchange.

Referring now to FIG. 7B, there is depicted the TT record preparation sequence while the call continues with the mobile in the serving exchange. One of three possible events can take place after the mobile has been handed off to the serving exchange: (a) either the call is handed off back to the anchor exchange; (b) the call terminates; or (c) the call is handed off to a third serving exchange. If another intersystem handoff of the mobile back to the anchor exchange is required, the call proceeds to block 340. A decision block 342 determines whether or not intersystem handoff back to the anchor exchange is successful. If the handoff is successful, the YES branch is taken to block 344 where the time at which the intersystem handoff leg of the call ended is recorded in the handoff section of the TT record being maintained by the anchor exchange. The system flow proceeds to block 346 at which the partial TT record for the intersystem leg of the call is output and to block 348 where the partial TT record for the intersystem leg of the call is released at point X which is the same location as block 315 of FIG. 7A. At block 315, the call is positioned within the anchor exchange, and within the main section of the TT record of the anchor exchange for the call, as if the intersystem handoff never occurred. If, however, the attempted interexchange handoff is not successful at 342, a NO branch is taken to decision block 350, at which it is determined whether or not the call can continue. If the call can continue, a YES branch returns the call to the serving exchange and the call continues despite the inability to complete the handoff at 342. If the call cannot continue at 350 and is therefore terminated, a NO branch is taken to block 354 following which the appropriate records regarding termination are generated at 356.

If the call is terminated while the mobile is located in the serving exchange at block 354, block 356 is reached and billing information is generated which reflects an end to the intersystem handoff leg of the call by recording the time of call termination in the handoff section of the TT record. The system flow then proceeds to block 358, where the time of call termination is written into the main TT record and then to block 360 where the main TT record is output. At block 362 a partial TT record or section of the toll ticketing record for the intersystem handoff leg of the call is output, and then both the main TT record and the partial TT record for the intersystem handoff leg of the call are released at block 364 following which the mobile unit returns to the IDLE state at block 302.

If the call to the mobile subscriber is not terminated while it is in the serving exchange to which it was handed off by the anchor exchange but, instead, a second intersystem handoff from the serving exchange to a third exchange is required, the system program flow diagram enters block 370 where a second intersystem handoff is required. The flow diagram then proceeds to decision block 372 where an intersystem handoff is attempted and a decision made as to whether or not the intersystem handoff to a third exchange was successful. If that decision is affirmative, the YES branch is taken to block 374 and the partial TT record, for the first intersystem handoff leg of the call, is output at block 374 and, at block 376, that partial TT record is released and the call is routed to block 378 at point Z in FIG. 7A where another section of the TT record is seized, initialized and time stamped for the new intersystem handoff leg of the call.

If the handoff is not successful at decision block 372, the NO branch is taken at block 350 to determine if the call can continue in the first serving exchange and the system flow thereafter proceeds as before.

As can be see from the above explanation and illustrative examples, the method and system of the present invention enable the preparation of a toll ticketing record which includes, not only the main information concerning the initiation and termination of a call to or from a mobile, but also additional partial toll ticketing records which reflect information concerning the use of the communications facilities of another system to serve the call. Such partial toll ticketing records enable the continued use of the present ticketing and billing routines of a mobile system but add the feature of enabling other exchanges to receive compensation for the use of these facilities.

While it is believed that the method and apparatus shown and described has been characterized as being preferred, it will be obvious that various changes and modifications may be made therein without departing from the spirit and scope of the invention as defined in the following claims.

What is claimed is:

1. A method for producing a toll ticketing record for a call with a mobile subscriber moving within the cells of a cellular mobile radio communications network which includes at least two different exchanges, an anchor exchange in which the mobile was located when the call began and a serving exchange into which the mobile moves while the call is in progress, said method comprising:
   generating within said anchor exchange a toll ticketing record in response to the initiation of a call to which said mobile is a party, said record including a call identification number and a number identifying said mobile;
   entering a start time in said toll ticketing record in response to an answer by the called party of said initiated call;
   attempting a first handoff of the radio circuit of said mobile from said anchor exchange to said serving in response to said mobile moving from the cells of one exchange to the other;
   allocating a section of said toll ticketing record for information related to an intersystem call in response of said handoff being successfully completed;
   entering a designation in the intersystem call section of said toll ticketing record as to the identity of the exchange to which the handoff was completed;
   entering a start time in the intersystem call section of said toll ticketing record;
   entering a stop time in the intersystem call section of said toll ticketing record in response to either the successful completion of a second handoff of the mobile from the serving to another exchange or to termination of the call;
   entering a stop time in the toll ticketing record in response to termination of the call; and
   outputting and releasing the toll ticketing record.

2. A method for producing a toll ticketing record for a call with a mobile subscriber moving within the cells of a cellular mobile radio communications network which includes at least two different exchanges, an anchor exchange in which the mobile was located when the call began and a serving exchange into which the mobile moves while the call is in progress as set forth in claim 1 which includes the additional steps of:
   attempting a second handoff of the radio circuit of the mobile from the serving exchange to the anchor exchange;
   entering a stop time in the intersystem call section of said toll ticketing record in response to the completion of the second handoff;
   entering a stop time in the toll ticketing record in response to termination of the call; and
   outputting and releasing the toll ticketing record.

3. A method for producing a toll ticketing record for a call with a mobile subscriber moving within the cells of a cellular mobile radio communications network which includes at least two different exchanges, an anchor exchange in which the mobile was located when the call began and a serving exchange into which the mobile moves while the call is in progress as set forth in claim 1 which includes the additional steps of:
   attempting a second handoff of the radio circuit of the mobile from the serving exchange to a second serving exchange;
   entering a stop time in the intersystem call section of said toll ticketing record in response to the completion of the second handoff;
   allocating a second section of said toll ticketing record for information related to a second intersystem call in response of said second handoff being successfully completed;
   entering a designation in the intersystem call section of said toll ticketing record as to the identity of the exchange to which the handoff was completed;
   entering a start time in the second intersystem call section of said toll ticketing record;
   entering a stop time in the intersystem call section of said toll ticketing record in response to either the successful completion of a third handoff of the mobile from the second serving exchange to another exchange or to termination of the call;
   entering a stop time in the toll ticketing record in response to termination of the call; and
   outputting and releasing the toll ticketing record.

4. A system for producing a toll ticketing record for a call with a mobile subscriber moving within the cells of a cellular mobile radio communications network which includes at least two different exchanges, an anchor exchange in which the mobile was located when the call began and a serving exchange into which the mobile moves while the call is in progress, said system comprising:
   means for generating within said anchor exchange a toll ticketing record in response to the initiation of a call to which said mobile is a party, said record including a call identification number and a number identifying said mobile;
   means for entering a start time in said toll ticketing record in response to an answer by the called party of said terminated call;
   means responsive to said mobile moving from the cells of one exchange to the other for attempting a first handoff of the radio circuit of said mobile from said anchor exchange to said serving;

means responsive to said handoff being successfully completed for allocating a section of said toll ticketing record for information related to an intersystem call;

means for entering a designation in the intersystem call section of said toll ticketing record as to the identity of the exchange to which the handoff was completed;

means for entering a start time in the intersystem call section of said toll ticketing record;

means responsive to either the successful completion of a second handoff for the mobile from the serving to another exchange or to termination of the call for entering a stop time in the intersystem call section of said toll ticketing record;

means for entering a stop time in the toll ticketing record in response to termination of the call; and means for outputting and releasing the toll ticketing record.

5. A system for producing a toll ticketing record for a call with a mobile subscriber moving within the cells of a cellular mobile radio communications network which includes at least two different exchanges, an anchor exchange in which the mobile was located when the call began and a serving exchange into which the mobile moves while the call is in progress as set forth in claim 4 which includes:

means for attempting a second handoff of the radio circuit of the mobile from the serving exchange to the anchor exchange;

means responsive to the completion of the second handoff for entering a stop time in the intersystem call section of said toll ticketing record;

means responsive to termination of the call for entering a stop time in the toll ticketing record; and means for outputting and releasing the toll ticketing record.

6. A system for producing a toll ticketing record for a call with a mobile subscriber moving within the cells of a cellular mobile radio communications network which includes at least two different exchanges, an anchor exchange in which the mobile was located when the call began and a serving exchange into which the mobile moves while the call is in progress as set forth in claim 4 which also includes:

means for attempting a second handoff of the radio circuit of the mobile from the serving exchange to a second serving exchange;

means responsive to the completion of the second handoff for entering a stop time in the intersystem call section of said toll ticketing record;

means responsive to the second handoff being successfully completed for allocating a second section of said toll ticketing record for information related to a second intersystem call;

means for entering a designation in the intersystem call section of said toll ticketing record as to the identity of the exchange to which the handoff was completed;

means for entering a start time in the second intersystem call section of said toll ticketing record;

entering a stop time in the intersystem call section of said toll ticketing record in response to either the successful completion of a third handoff of the mobile from the second serving exchange to another exchange or to termination of the call;

entering a stop time in the toll ticketing record in response to termination of the call; and outputting and releasing the toll ticketing record.

* * * * *